United States Patent
Khare et al.

(10) Patent No.: US 6,865,742 B1
(45) Date of Patent: Mar. 8, 2005

(54) RUN-TIME PROPERTY-BASED LINKING OF SOFTWARE MODULES

(75) Inventors: Aniruddha Khare, Cupertino, CA (US); Karunakar Reddy Parne, Bangalore (IN); Michael Boe, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 586 days.

(21) Appl. No.: 09/931,822

(22) Filed: Aug. 16, 2001

(51) Int. Cl.$^7$ ................................................ G06F 9/54
(52) U.S. Cl. ...................................... 719/331; 719/318
(58) Field of Search ................................ 719/331, 332, 719/318, 321, 327; 717/163

(56) References Cited

U.S. PATENT DOCUMENTS

| | | | |
|---|---|---|---|
| 5,916,308 A | * 6/1999 | Duncan et al. | 719/331 |
| 5,974,470 A | * 10/1999 | Hammond | 719/331 |
| 6,003,095 A | * 12/1999 | Pekowski et al. | 717/163 |
| 6,292,843 B1 | * 9/2001 | Romano | 719/331 |

OTHER PUBLICATIONS

Zoran M. Todorovic, "Dynamic DLL Loading" pp. 1–3, http://www.codeproject.com/dll/dynamicdllloading.asp.
Mohit Khanna, "Plug–In Framework Using DLL's", pp. 1–8, http://thecodeproject.com/dll/plugin.asp.
Phil McGahan, "How To Share A Data Segment In A DLL", pp. 1–2, http://thecodeproject.com/dll/data seg share.asp.

* cited by examiner

Primary Examiner—St. John Courtenay, III
(74) Attorney, Agent, or Firm—Thelen Reid & Priest, LLP; John P. Schaub (57) ABSTRACT

A method for dynamic linking of software modules includes detecting an event during the execution of a computer program that resides in a first memory, ascertaining whether there is at least one required property associated with the event if the event is detected, determining a property identifier for the at least one required property and loading at least one code module from a second memory into the first memory based upon a property identifier configured with the executable code module. According to one aspect, the loading includes loading the at least one executable code module into the first memory if it is not in the first memory. According to another aspect, the at least one executable code module includes at least one dynamic link library (DLL). According to another aspect, the event includes the addition of a hardware device and the required property includes a hardware device PROM identifier.

44 Claims, 7 Drawing Sheets

RUN-TIME PROPERTY-BASED LINKING OF SOFTWARE MODULES

FIELD OF THE INVENTION

The present invention relates to the field of computer science. More particularly, the present invention relates to a system and method for run-time property-based linking of software modules.

BACKGROUND OF THE INVENTION

A Dynamic Link Library ("DLL") represents a very powerful and efficient way for applications to share code and data. A DLL is an executable library module containing functions or resources for use by applications or other DLLs. Unlike typical programs however, DLLs do not have a single entry point. Instead, like libraries, DLLs can have multiple entry points, one for each exported subroutine ("Subroutine") or function ("Function").

Static linking is known to those of ordinary skill in the art as the process of writing one or more modules and then linking them to create a complete, stand-alone executable program. When a program uses a Subroutine or Function from a library, a copy of that Subroutine or Function's code is added to the program's executable file. If two programs are running simultaneously and use the same Subroutine or Function, there will be two copies of that routine present in memory. It would be more efficient in terms of memory usage if the two programs could share a single copy of the routine. DLLs provide that ability.

In contrast to static linking, dynamic linking using DLLs provides a mechanism to link applications to libraries at run-time. Unlike a static library, the code in a DLL is not included into the program that uses the DLL. Instead, a DLL's code and resources are in a separate file (usually with a .DLL extension). This file must be either currently loaded in memory or accessible to the operating system when the program that uses the DLL executes. To access the individual procedures in a DLL, a DECLARE statement is typically included in the program code with the name of the Subroutine or Function and the name of the DLL.

Unlike conventional libraries, when a DLL is loaded into memory by the operating system, its procedures are accessible by all other programs (or DLLs). Only one copy of the DLL needs to be present in memory. This is possible because the library is not linked into any one of the programs permanently. It is simply present in memory, making its services available to any code that may need them.

Before a Function or Subroutine in a DLL can be used, the DLL must first be loaded into memory. Such loading is typically performed using one of two approaches. Under one approach, most of the linking takes place at compilation time and the "dynamic linking" that takes place during run-time is typically restricted to the resolution of symbols. An application that uses a DLL is typically unaware of the provenance of the resolved symbols. To use this approach, a Function or Subroutine that resides in the DLL is typically declared with the "external" keyword. The DLL is automatically loaded when the application loads, and any functions or procedures exported from the DLL can then be called just as any other Function or Subroutine would be called. This is by far the easiest way to use code contained in a DLL. The disadvantage to this approach is that if a DLL that the program references is missing, the program will refuse to load.

Under the second approach a DLL is only loaded into memory when needed and unloaded from memory when it is no longer needed. One advantage of this approach is that the DLL is in memory only as long as it is needed, resulting in more efficient use of memory. Another advantage is that applications will typically load more quickly when using this approach because not all the code needed to run the program is loaded when the application initially loads.

In DLL collections of software modules, a first software module that references an external Subroutine or Function typically knows the identity or name of a second software module that contains the referenced Subroutine or Function and is thus required for the execution of the first software module. However, there are situations where the first software module knows a property required for the execution of the first software module, but does not know the name of the software module that includes that property.

A chassis management software program provides an example of such a situation. A network computer contains a number of hardware devices connected together via the network. The hardware devices may be housed in a chassis configured with one or more ports to accept various types of modular hardware devices. In such a system, a particular port adapter driver DLL is typically required to interface between the chassis management program and each hardware device. Each hardware device normally contains identification information for the device. This information is usually stored on a programmable read only memory chip (PROM) but any number of non-volatile memory storage media are possible. When the memory device is in PROM, it is usually referred to as the identifier (ID) PROM of the device. The type of information stored on each of these devices usually includes identification information such as the device's serial number or its part number.

When a new hardware device is added, a chassis driver software module within the chassis management program must load the DLL that includes the port adapter driver required to interface with the hardware device. In this case, the chassis driver knows the required property of the driver is the PROM ID of the inserted hardware device. That is, the chassis driver knows it must load a port adapter driver that is compatible with the hardware device identified by the PROM ID.

In order to load the appropriate port adapter driver, the chassis driver needs to know the name of the DLL that includes the port adapter driver for the hardware device. In such cases, the PROM ID of the hardware device is typically encoded in the name of the DLL that includes the port adapter driver for the hardware device. This information is typically hard-coded in a table. Thus, the chassis driver reads the PROM ID of the newly inserted hardware device, forms the DLL name based on the PROM ID and loads the DLL. This process is described below with reference to FIG. 1.

Figure 1:
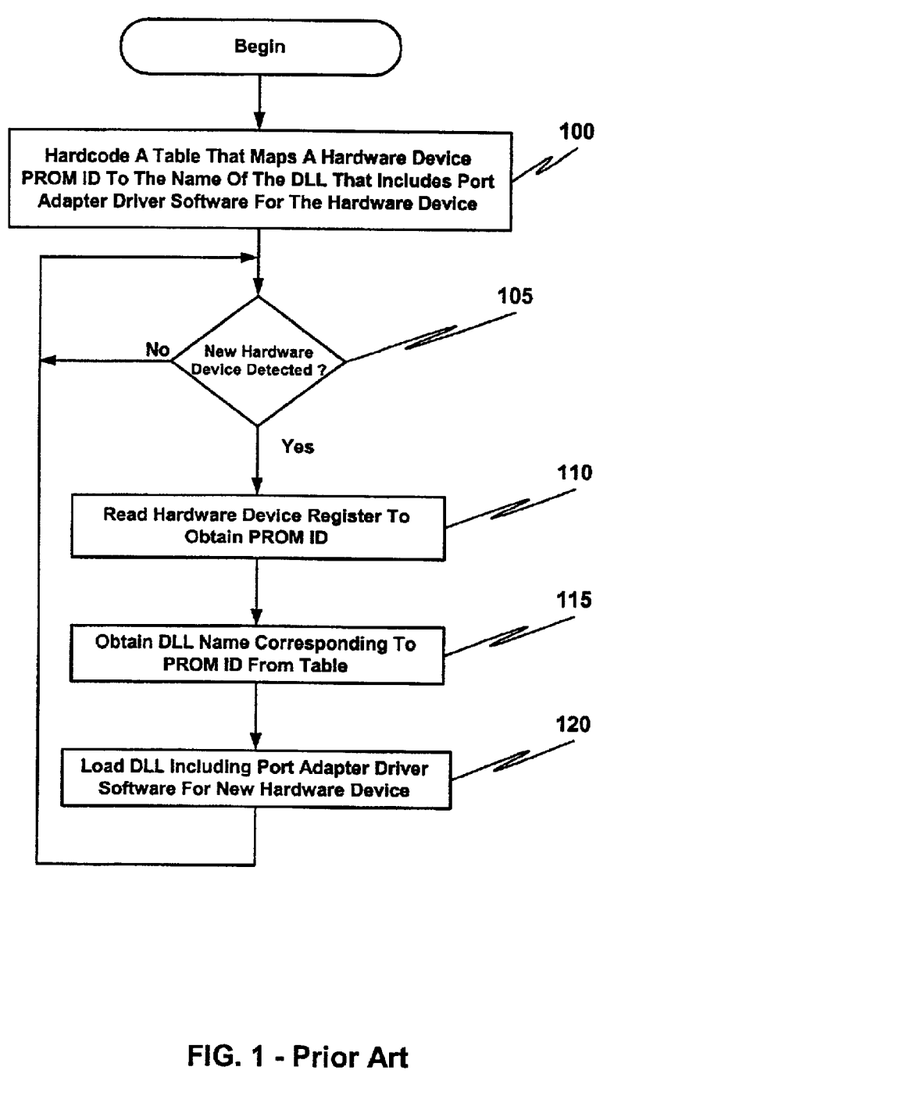
FIG. 1 is a flow diagram that illustrates a typical method for dynamically loading a dynamic link library (DLL) required for a new hardware device.

FIG. 1 is a flow diagram that illustrates a typical method for dynamically loading a DLL required for a new hardware device. At 100, a table that maps a hardware device PROM ID to the name of the DLL that includes port adapter driver software for the hardware device is created. The table is typically hard-coded in a chassis management program. The chassis management program includes a chassis driver software module that handles the addition of new hardware. At 105, a determination is made regarding whether a new hardware device has been detected. If a new hardware device has been detected, at 110 the chassis driver reads a register of the new hardware device to obtain the hardware device PROM ID. At 115, the name of the DLL including the port adapter driver for the new hardware device is obtained from the table using the PROM ID obtained at 110. At 120, the DLL including port adapter driver for the new hardware device is loaded, allowing a chassis management program to interface with the device.

However, a port adapter driver can drive hardware with different PROM IDs. A port adapter driver can also drive hardware devices on different platforms. Additionally, the hardware device and/or the associated port adapter driver may not exist when the chassis is made. PROM ID-to-DLL name encoding method described above supports none of these scenarios.

What is needed is solution that enables execution of a computer program where the identity of a required module is discovered dynamically during program execution. A further need exists for such a solution that uses open and well-understood standards.

BRIEF DESCRIPTION OF THE INVENTION

A method for dynamic linking of software modules includes detecting an event during the execution of a computer program that resides in a first memory, ascertaining whether there is at least one required property associated with the event if the event is detected, determining a property identifier for the at least one required property and loading at least one executable code module from a second memory into the first memory based upon a property identifier configured with the executable code module. According to one aspect, the loading includes loading the at least one executable code module into the first memory if it is not already in the first memory. According to another aspect, the at least one executable code module includes at least one dynamic link library (DLL). According to another aspect, the event includes the addition of a hardware device and the required property includes a hardware device PROM ID.

An apparatus for dynamic linking of software modules includes an ascertainer, a determiner and a loader. The ascertainer is responsive to an event signal indicating the detection of an event during the execution of a computer program residing in a first memory. The ascertainer is configured to ascertain whether there is at least one property associated with the event. The determiner is coupled to the ascertainer and is configured to determine a property identifier for the at least one required property. The loader is coupled to the determiner and is configured to load at least one executable code module from a second memory into the first memory based upon a property identifier configured with the executable code module. According to one aspect, the loader is configured to load the at least one executable code module into the first memory if it is not already in the first memory. According to another aspect, the at least one executable code module includes at least one dynamic link library (DLL). According to another aspect, the event includes the addition of a hardware device and the required property includes a hardware device PROM ID.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF A PREFERRED EMBODIMENT

Embodiments of the present invention are described herein in the context of a method and apparatus for run-time property-based linking of software modules. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 2:
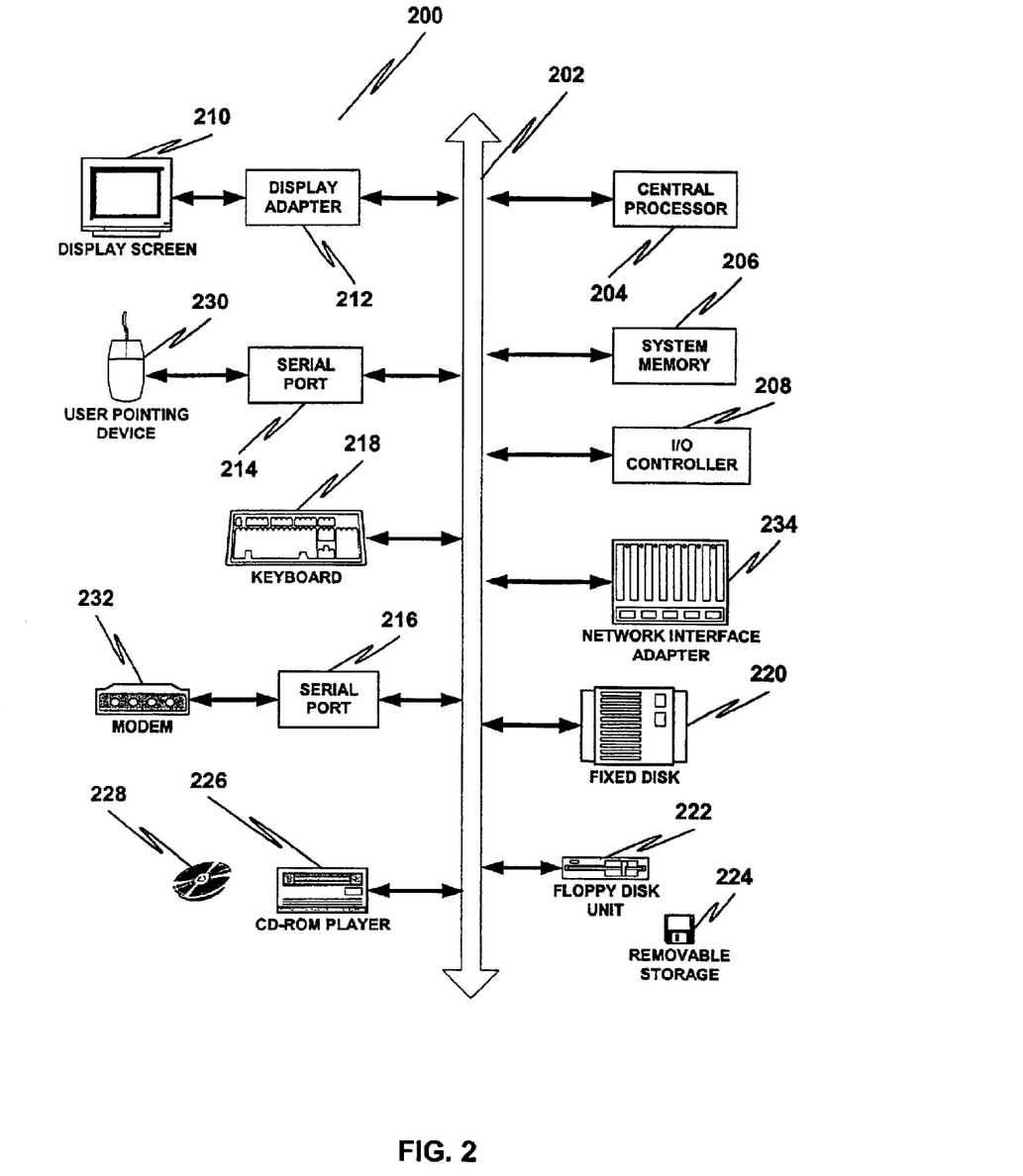
FIG. 2 is a block diagram of a client computer system suitable for implementing aspects of the present invention.

FIG. 2 depicts a block diagram of a computer system 200 suitable for implementing aspects of the present invention. As shown in FIG. 2, computer system 200 includes a bus 202 which interconnects major subsystems such as a central processor 204, a system memory 206 (typically RAM), an input/output (I/O) controller 208, an external device such as a display screen 210 via display adapter 212, serial ports 214 and 216, a keyboard 218, a fixed disk drive 220, a floppy disk drive 222 operative to receive a floppy disk 224, and a CD-ROM player 226 operative to receive a CD-ROM 228. Many other devices can be connected, such as a pointing device 230 (e.g., a mouse) connected via serial port 214 and a modem 232 connected via serial port 216. Modem 232 may provide a direct connection to a remote server via a telephone link or to the Internet via a POP (point of presence). Alternatively, a network interface adapter 234 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 2 to be present to practice the present invention, as discussed below. Furthermore, the devices and subsystems may be interconnected in different ways from that shown in FIG. 2. The operation of a computer system such as that shown in FIG. 2 is readily known in the art and is not discussed in detail in this application, so as not to overcomplicate the present discussion. Code to implement the present invention may be operably disposed in system memory 206 or stored on storage media such as fixed disk 220, floppy disk 224 or CD-ROM 228.

According to embodiments of the present invention, properties are associated with software modules and a software module requests dynamic association with other software modules based upon one or more required properties discovered during run-time.

For the purpose of this disclosure, a module may comprise a Function or Subroutine. A module may also comprise a library that includes one or more Function or Subroutine.

Figure 3:
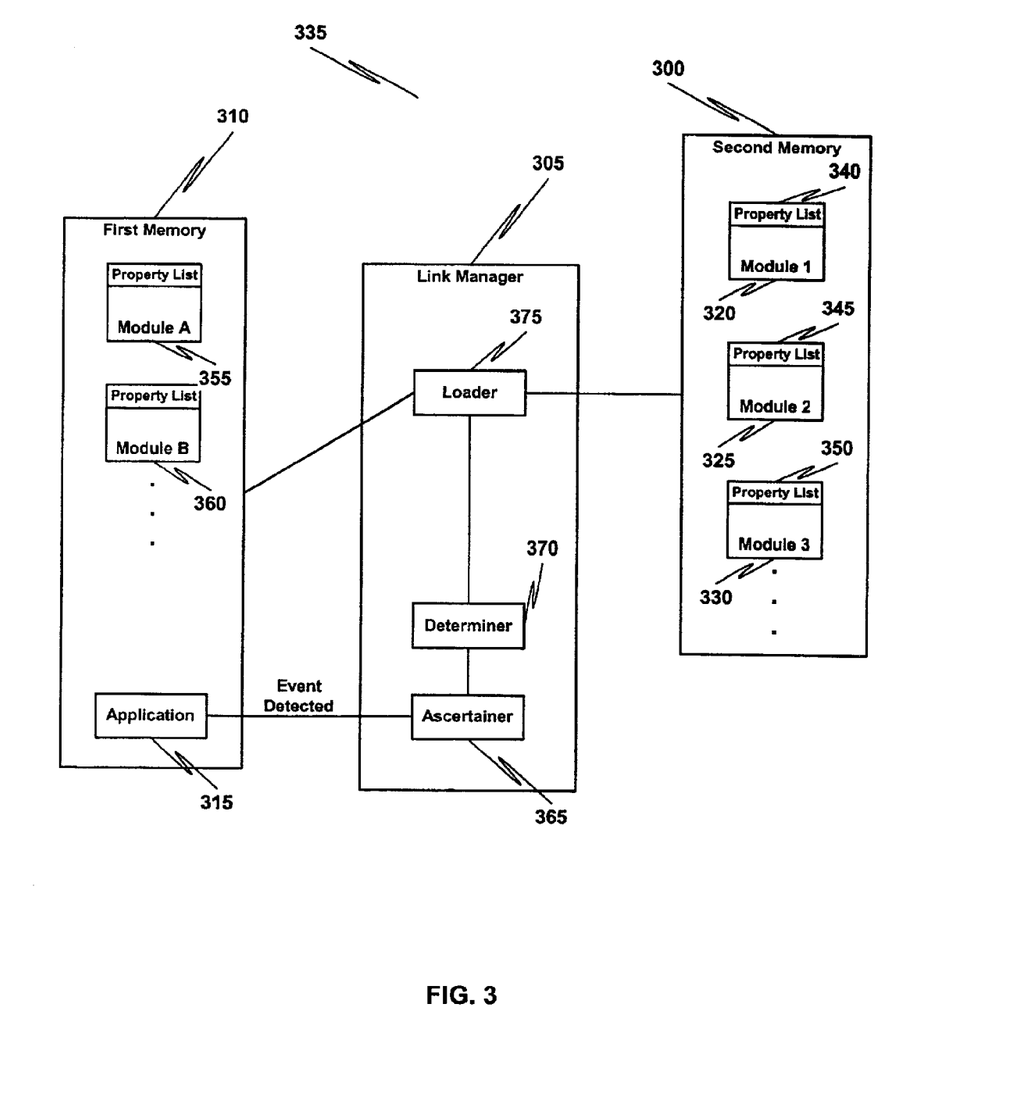
FIG. 3 is a block diagram that illustrates an apparatus for run-time property-based linking of software modules in accordance with one embodiment of the present invention.

Turning now to FIG. 3, a block diagram that illustrates an apparatus for run-time property-based linking of software modules in accordance with one embodiment of the present invention is presented. Second memory 300 is coupled to link manger 305. Link manger 305 is coupled to first memory 310 and application program 315. Second memory 300 includes modules (320–330) that have been installed on the apparatus 335. Each module 320–330 includes a property list 340–350 that pertains to at least one Function or Subroutine in the module. Each property list 340–350 includes at least one property that pertains to at least one Function or Subroutine in the module. First memory 310 may reside in a system memory as illustrated by reference numeral 206 in FIG. 2. First memory 310 includes installed modules (355–360) that have been loaded into first memory 310. Link manger 305 includes an ascertainer 365 coupled to a determiner 370, which is coupled to a loader 375.

In operation, application program 315 sends a signal to ascertainer 365 when an event is detected. According to embodiments of the present invention, the event comprises the addition or removal of a hardware device. According to other embodiments of the present invention, the event comprises the addition, removal or modification of a software module. Such events may require that modules having particular properties are present in the first memory. If the modules are not present in the first memory, they may need to be loaded into the first memory before program execution may proceed. Ascertainer 365 receives the event notification from the application program 315 and ascertains the required properties for the event. Determiner 370 determines the property identifier for each required property. Loader 375 receives a required property identifier from determiner 370, finds each installed module in second memory 300 that is associated with the property identifier and loads the module into first memory 310 if the module is not already in first memory 310.

Figure 4:
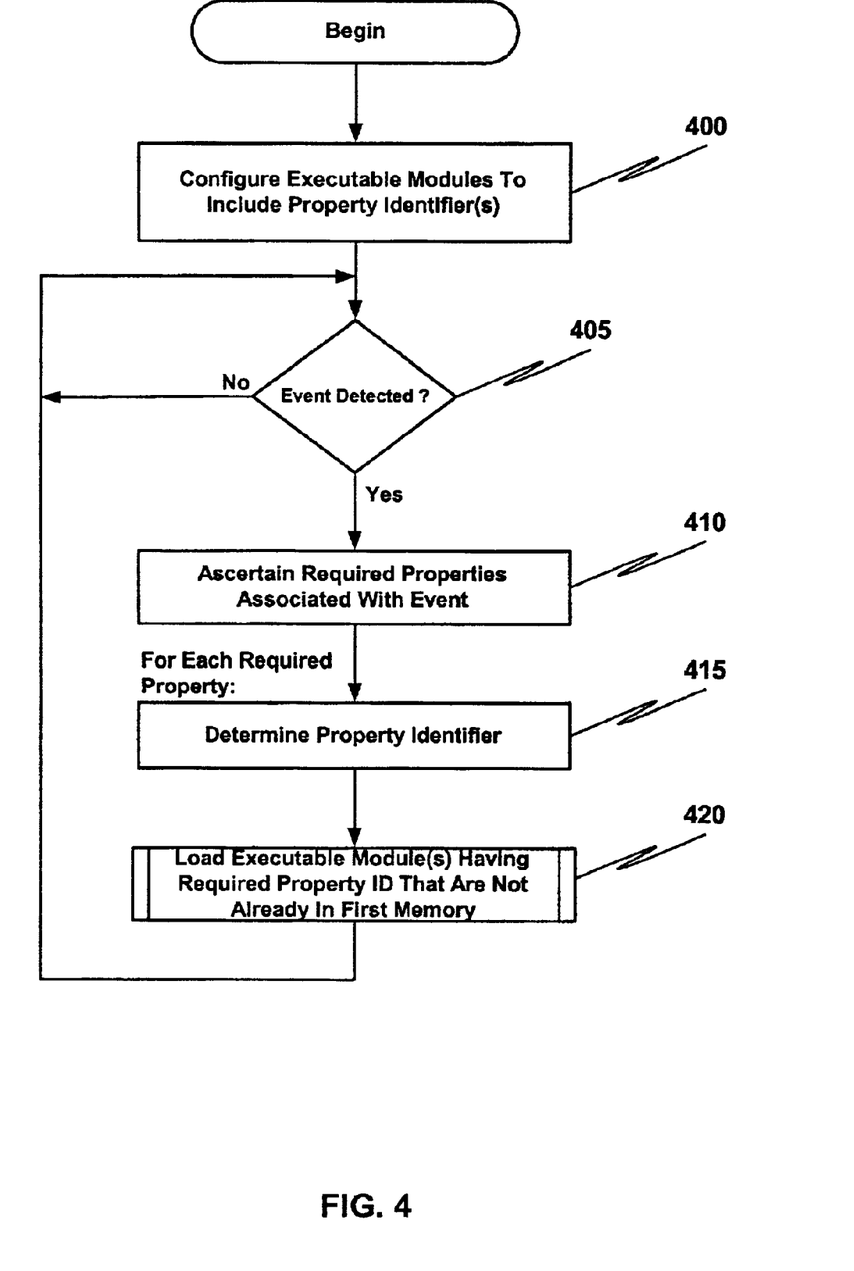
FIG. 4 is a flow diagram that illustrates a method for run-time property-based linking of software modules in accordance with one embodiment of the present invention.

Turning now to FIG. 4, a flow diagram that illustrates a method for run-time property-based linking of software modules in accordance with one embodiment of the present invention is presented. FIG. 4 corresponds with the apparatus illustrated by FIG. 3. At 400, modules are configured to include property identifiers. The property identifiers may be included in the modules. Alternatively, each module may include a link to a file that includes the property identifiers associated with the module. At 405, a determination is made regarding whether an event has been detected. If an event has been detected, at 410 required properties of the new software module are ascertained. At 415, the property identifier for each required property is determined. At 420, modules having the required property identifier that are not already in first memory are loaded into first memory. This process continues at reference numeral 405 for the next event that is detected.

Figure 5:
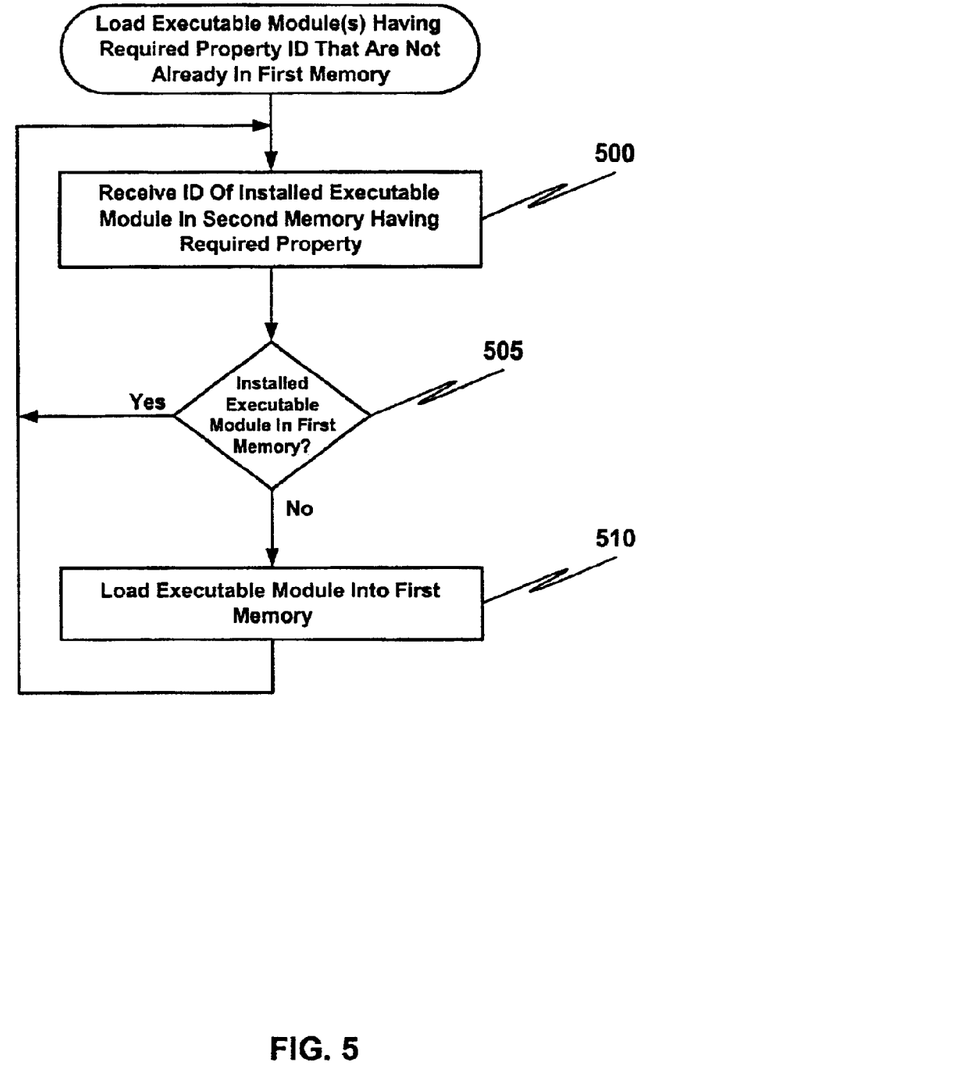
FIG. 5 is a flow diagram that illustrates a method for loading a module having a required property when the module is not already in a first memory in accordance with one embodiment of the present invention.

Turning now to FIG. 5, a flow diagram that illustrates a method for loading a module having a required property when the module is not already in a first memory in accordance with one embodiment of the present invention is presented. FIG. 5 provides more detail for reference numeral 420 of FIG. 4. At 500, the identifier of an installed module having a required property is received. At 505, a determination is made regarding whether the installed module is also in the first memory. If the installed module is not in the first memory, at 410 the module is loaded into the first memory.

Figure 6:
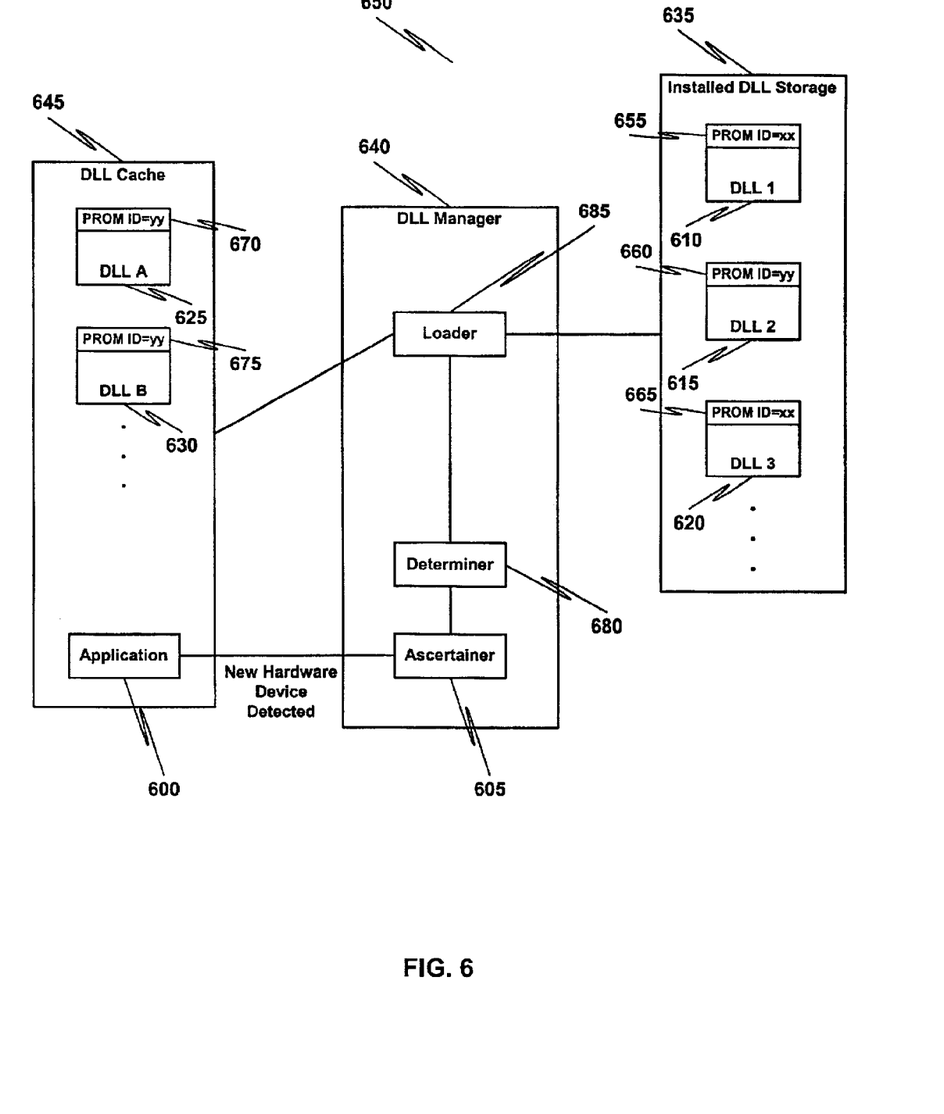
FIG. 6 is a block diagram that illustrates an apparatus for run-time property-based linking of software modules in accordance with one embodiment of the present invention.
Figure 7:
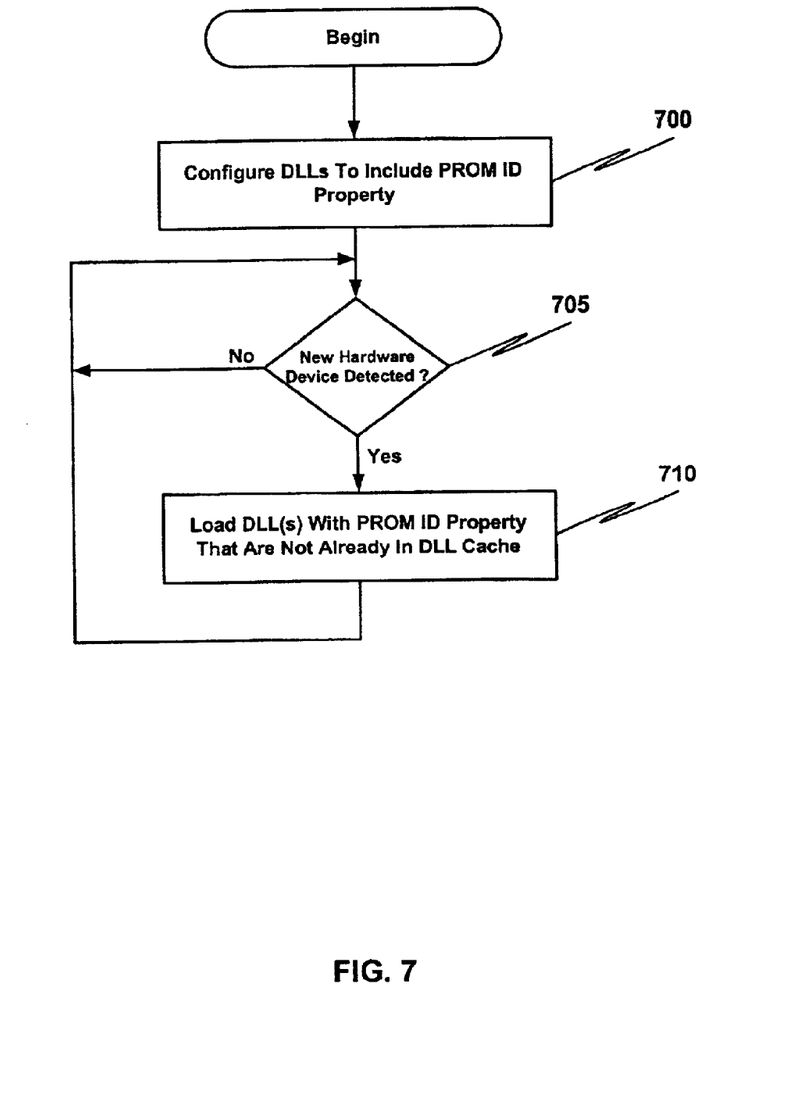
FIG. 7 is a flow diagram that illustrates a method for run-time property-based linking of software modules in accordance with one embodiment of the present invention.

FIGS. 6 and 7 illustrate embodiments of the present invention that perform run-time property-based linking using DLLs.

Turning now to FIG. 6, a block diagram that illustrates an apparatus for loading DLLs in accordance with one embodiment of the present invention is presented. FIG. 6 is similar to FIG. 3, except that application 600 sends a signal to ascertainer 605 when a new hardware device is detected and that the required property comprises the hardware device PROM ID (610–620 and 625–630). Installed DLL storage 635 is coupled to DLL manger 640. DLL manger 640 is coupled to DLL cache 645 and application program 600. Installed DLL storage 635 includes DLLs (610–620) that have been installed on the apparatus 650. Each DLL 610–620 includes a property list 655–665 that pertains to at least one Function or Subroutine in the DLL. Each property list 655–665 includes at least one property that pertains to at least one Function or Subroutine in the DLL. DLL cache 645 may reside in a system memory as illustrated by reference numeral 206 in FIG. 2. DLL cache 645 includes installed DLLs (625–630) that have been loaded into DLL cache 645. DLL manager 640 includes an ascertainer 605 coupled to a determiner 680, which is coupled to a loader 685.

In operation, application program 600 sends a signal to ascertainer 605 when an event is detected. Ascertainer 605 receives the event notification from the application program 600 and ascertains the required properties for the event. Determiner 680 determines the property identifier for each required property. Loader 685 receives a required property identifier from determiner 680, finds each installed module in installed DLL storage 635 that is associated with the property identifier and loads the module into DLL cache 645 if the DLL is not already in installed DLL cache 645.

Turning now to FIG. 7, a flow diagram that illustrates a method for run-time property-based linking of software modules in accordance with one embodiment of the present invention is presented. At 700, DLLs are configured to include the PROM ID of each hardware device that requires the DLL in order to properly interface with an application program such as a chassis management program. The PROM IDs may be included in the DLLs. Alternatively, each DLL may include a link to a file that includes the PROM IDs associated with the DLL. At 705, a determination is made regarding whether a new hardware device has been detected. If a new hardware device has been detected, at 710 DLLs with the PROM ID that are not already in DLL cache are loaded into DLL cache. This process continues at reference numeral 705 for the next new hardware device that is detected.

One advantage of the present invention is that a software module need not know before program execution, the names of all compatible software modules that could possibly be required during program execution. Required software modules may be specified using one or more properties that can be configured with the modules relatively late, such as when a module is delivered to a user. Thus, the same software modules can be configured with different properties depending upon the type of platform on which the modules are used. Additionally, different hardware devices driven by the same port adapter driver can use the same property to use the same port adapter driver.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for dynamic linking of software modules, the method comprising:

detecting an event during the execution of a computer program, said program resident in a first memory;

ascertaining whether there is at least one required property associated with said event if said event is detected;

determining a property identifier for said at least one required property if said event is detected; and loading at least one executable code module from a second memory into said first memory if said event is detected, said at least one executable code module configured with said property identifier.

2. The method of claim 1 wherein said at least one executable code module comprises at least one dynamic link library (DLL).

3. The method of claim 1 wherein said event comprises the addition of a hardware device.

4. The method of claim 3 wherein said required property identifier comprises a programmable read only memory (PROM) identifier.

5. The method of claim 1 wherein said event comprises the removal of a hardware device.

6. The method of claim 1 wherein said event comprises the addition of a software module.

7. The method of claim 1 wherein said event comprises the removal of a software module.

8. The method of claim 1 wherein said event comprises the modification of a software module.

9. The method of claim 1 wherein said loading further comprises loading into said first memory said at least one executable code module if said at least one executable code module is not in said first memory.

10. The method of claim 1 wherein said at least one executable code module comprises at least one dynamic link library (DLL);

said event comprises the addition of a hardware device; and said required property comprises a PROM identifier.

11. The method of claim 10 wherein said first memory comprises a DLL cache memory; and said second memory comprises an installed DLL memory.

12. A program storage device readable by a machine, embodying a program of instructions executable by the machine to perform a method for dynamic linking of software modules, the method comprising:

detecting an event during the execution of a computer program, said program resident in a first memory;

ascertaining whether there is at least one required property associated with said event if said event is detected;

determining a property identifier for said at least one required property if said event is detected; and loading at least one executable code module from a second memory into said first memory if said event is detected, said at least one executable code module configured with said property identifier.

13. The program storage device of claim 12 wherein said at least one executable code module comprises at least one dynamic link library (DLL).

14. The program storage device of claim 12 wherein said event comprises the addition of a hardware device.

15. The program storage device of claim 14 wherein said required property identifier comprises a PROM identifier.

16. The program storage device of claim 12 wherein said event comprises the removal of a hardware device.

17. The program storage device of claim 12 wherein said event comprises the addition of a software module.

18. The program storage device of claim 12 wherein said event comprises the removal of a software module.

19. The program storage device of claim 12 wherein said event comprises the modification of a software module.

20. The program storage device of claim 12 wherein said loading further comprises loading into said first memory said at least one executable code module if said at least one executable code module is not in said first memory.

21. The program storage device of claim 12 wherein said at least one executable code module comprises at least one dynamic link library (DLL);

said event comprises the addition of a hardware device; and said required property comprises a PROM identifier.

22. The program storage device of claim 21 wherein said first memory comprises a DLL cache memory; and said second memory comprises an installed DLL memory.

23. An apparatus for dynamic linking of software modules, the apparatus comprising:

means for detecting an event during the execution of a computer program, said program resident in a first memory;

means for ascertaining whether there is at least one required property associated with said event if said event is detected;

means for determining a property identifier for said at least one required property if said event is detected; and means for loading at least one executable code module from a second memory into said first memory if said event is detected, said at least one executable code module configured with said property identifier.

24. The apparatus of claim 23 wherein said at least one executable code module comprises at least one dynamic link library (DLL).

25. The apparatus of claim 23 wherein said event comprises the addition of a hardware device.

26. The apparatus of claim 25 wherein said required property identifier comprises a PROM identifier.

27. The apparatus of claim 23 wherein said event comprises the removal of a hardware device.

28. The apparatus of claim 23 wherein said event comprises the addition of a software module.

29. The apparatus of claim 23 wherein said event comprises the removal of a software module.

30. The apparatus of claim 23 wherein said event comprises the modification of a software module.

31. The apparatus of claim 23 wherein said means for loading further comprises means for loading into said first memory said at least one executable code module if said at least one executable code module is not in said first memory.

32. The apparatus of claim 23 wherein said at least one executable code module comprises at least one dynamic link library (DLL);

said event comprises the addition of a hardware device; and said required property comprises a PROM identifier.

33. The apparatus of claim 32 wherein said first memory comprises a DLL cache memory; and said second memory comprises an installed DLL memory.

34. An apparatus for dynamic linking of software modules, the apparatus comprising:

an ascertainer responsive to an event signal that indicates the detection of an event during the execution of a computer program, said ascertainer configured to ascertain whether there is at least one property associated with said event, said program resident in a first memory;

a determiner operatively coupled to said ascertainer, said determiner configured to determine a property identifier for said at least one required property; and a loader operatively coupled to said determiner, said loader configured to load at least one executable code module from a second memory into said first memory, said at least one executable code module configured with said property identifier.

35. The apparatus of claim 34 wherein said at least one executable code module comprises at least one dynamic link library (DLL).

36. The apparatus of claim 34 wherein said event comprises the addition of a hardware device.

37. The apparatus of claim 36 wherein said required property identifier comprises a PROM identifier.

38. The apparatus of claim 34 wherein said event comprises the removal of a hardware device.

39. The apparatus of claim 34 wherein said event comprises the addition of a software module.

40. The apparatus of claim 34 wherein said event comprises the removal of a software module.

41. The apparatus of claim 34 wherein said event comprises the modification of a software module.

42. The apparatus of claim 34 wherein said loader is further configured to load into said first memory said at least one executable code module if said at least one executable code module is not in said first memory.

43. The apparatus of claim 34 wherein said at least one executable code module comprises at least one dynamic link library (DLL);

said event comprises the addition of a hardware device; and said required property comprises a PROM identifier.

44. The apparatus of claim 43 wherein said first memory comprises a DLL cache memory; and said second memory comprises an installed DLL memory.

* * * * *

UNITED STATES PATENT AND TRADEMARK OFFICE
CERTIFICATE OF CORRECTION

PATENT NO. : 6,865,742 B1
APPLICATION NO. : 09/931822
DATED : March 18, 2005
INVENTOR(S) : Khare et al.

It is certified that error appears in the above-identified patent and that said Letters Patent is hereby corrected as shown below:

On the title page in Item 57 of the cover page after and loading at least one, insert --executable--.

In column 5 line 16, replace "Modern" with --Modem--.

Signed and Sealed this

Twenty-ninth Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 6,865,742 B1  Page 1 of 1
APPLICATION NO. : 09/931822
DATED : March 8, 2005
INVENTOR(S) : Khare et al.

It is certified that error appears in the above-identified patent and that said Letters Patent is hereby corrected as shown below:

On the title page in Item 57 of the cover page after and loading at least one, insert --executable--.

In column 5 line 16, replace "Modern" with --Modem--.

This certificate supersedes the Certificate of Correction issued January 29, 2008.

Signed and Sealed this

Nineteenth Day of February, 2008

JON W. DUDAS
*Director of the United States Patent and Trademark Office*